(12) United States Patent
Day

(10) Patent No.: US 10,974,294 B2
(45) Date of Patent: *Apr. 13, 2021

(54) SOIL RECLAMATION SYSTEM AND PROCESS

(71) Applicant: Ronald R. Day, St. George, UT (US)

(72) Inventor: Ronald R. Day, St. George, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,716

(22) Filed: Aug. 19, 2019

(65) Prior Publication Data

US 2020/0147660 A1    May 14, 2020

Related U.S. Application Data

(63) Continuation of application No. 14/872,999, filed on Oct. 1, 2015, now Pat. No. 10,384,244.

(51) Int. Cl.
*B09C 1/02* (2006.01)
*B09C 1/00* (2006.01)
*B09C 1/08* (2006.01)

(52) U.S. Cl.
CPC .......... *B09C 1/02* (2013.01); *B09C 1/00* (2013.01); *B09C 1/005* (2013.01); *B09C 1/08* (2013.01)

(58) Field of Classification Search
USPC ............ 198/495; 175/208; 405/128.1, 128.7
See application file for complete search history.

(56) References Cited

U.S. PATENT DOCUMENTS

| | | | |
|---|---|---|---|
| 3,438,584 A * | 4/1969 | Klein | A01C 3/00 239/651 |
| 5,242,246 A * | 9/1993 | Manchak, III | B09C 1/00 110/346 |
| 6,422,789 B1 * | 7/2002 | Brewer | B09C 1/00 405/128.7 |
| 2008/0240862 A1 * | 10/2008 | Kossowan | B08B 15/02 405/128.45 |

FOREIGN PATENT DOCUMENTS

| | | |
|---|---|---|
| CN | 202105841 U | 1/2012 |
| CN | 103706625 A | 4/2014 |

* cited by examiner

*Primary Examiner* — Sean D Andrish
(74) *Attorney, Agent, or Firm* — Jones Waldo Holbrook & McDonough, PC; Brent T. Winder

(57) ABSTRACT

A system for treating a contaminated soil. The system includes a soil receptacle, a first conveyance mechanism in communication with the soil receptacle, and a second conveyance mechanism in communication with the first conveyance mechanism. The second conveyor is placed lower relative to the first conveyor so that the contaminated soil drops in elevation as it passes from the first conveyor to the second conveyor. One or more pretreatment sprayers are positioned substantially at a junction between the first conveyor and the second conveyor and that spray the contaminated soil as it moves from the first conveyor to the second conveyor. One or more sprayers are also positioned on the second conveyor such that they can spray the contaminated soil as it passes. An aerator is located at a depositing end of the second conveyor, by which the contaminated soil is (Continued)

further aerated as it drops of the depositing end of the second conveyor and contacts the aerator. One or more optional final sprayers can be positioned on the second conveyor such that they are able to spray the contaminated soil as it drops off the depositing end and contacts the aerator.

19 Claims, 9 Drawing Sheets

SOIL RECLAMATION SYSTEM AND PROCESS

PRIORITY

This application claims priority to U.S. Provisional Patent Application No. 62/059,096 entitled "A SOIL RECLAMATION SYSTEM AND PROCESS," filed Oct. 2, 2014 which is hereby incorporated its by reference for its supporting teachings.

BACKGROUND

When drilling for oil, it has been customary to deposit drill cuttings, waste mud and runoff into a reserve pit—which is generally a large hole in the ground lined with plastic or some other water impermeable material to prevent liquids from leaching into the surrounding soil. In a typical reserve pit process the water is allowed to evaporate and then, once dried, the solids can typically be buried on site.

However, reserve pits often contain substantial quantities of contaminants such as petroleum hydrocarbons, diesel range organics, gasoline range organics, benzene and other harmful substances that can, over time, leach out into surrounding soil as a result of liner failure—even when proper drying and backfilling techniques have been employed. These contaminants can pollute water supplies and have devastating ecological effects on humans and wildlife. For these reasons, many drilling companies and government agencies are now actively seeking to reclaim former mining sites by cleansing the reserve pit soil.

Hydrogen peroxide ($H_2O_2$) is a known means for breaking down and treating a variety of contaminants including, but not limited to, chlorinated solvents; munitions; pesticides; petroleum residues; wood preservatives; etc. Current usages of hydrogen peroxide in connection with reserve pits are uneconomical and inefficient. In particular, the most prominent present methodologies are: 1) the contaminated soils are extracted and mixed with hydrogen peroxide in a surface mixer, leach pile, etc. and then redeposited (ex-situ treatment); or, alternatively, 2) the soils are treated in place with sprayers, sprinklers or nozzle injectors (in-situ treatment). Both of these methodologies as currently practiced have significant inefficiencies and limitations. For example, the ex-situ treatment requires large quantities of trucks and other heavy machinery to load and haul the materials off-site. This adds considerable expense and has a negative environmental impact as these trucks and machines often require large volumes of fuel and contribute to air pollution in their operation. Moreover, the sheer volume of trucks that such reclamation practices puts on the roads increases the likelihood of accidents simply as a matter of probabilities. The in-situ treatment is also less effective in that it does not allow for sufficient penetration and saturation of the soil with the hydrogen peroxide. Accordingly, the treatment process can fail to fully decontaminate the soil; or it takes considerably longer and costs more because repeat treatment is often necessary.

Soil shredders in combination with belt systems have been recently developed to improve exposure of contaminated soil to chemical treatments. However, these solutions have significant limitations. For example, while they improve soil penetration and saturation with the treatment chemicals, much of the soil still remains untouched and therefore untreated—meaning the process needs to be repeated requiring more additional time and expense. These prior art solutions also do not allow great flexibility in terms of adjusting treatment chemical concentrations. Current soil shredder systems also are prone to breakage and when they do break, key features are difficult to access and repair.

It would therefore be advantageous to have a soil treatment system and process that 1) maximizes exposure of the soil to the treatment chemical—e.g. the hydrogen peroxide solution; 2) allows greater saturation of the soil with the treatment chemicals while requiring less of that solution and is thereby substantially more efficient and less expensive in its operation; 3) and allows for instantaneous and precision adjustment of treatment chemical concentrations in response to field tests of both treated and pre-treated soil; and 4) has key components easily accessible such that they can readily be repaired or replaced as needed.

The present invention in its various embodiments addresses all the foregoing issues as well as others as described below.

SUMMARY

A system for treating a contaminated soil is disclosed. In certain embodiments, the system includes a soil receptacle; a first conveyor in communication with the soil receptacle; and a second conveyor in communication with the first conveyor. The contaminated soil moves from the soil receptacle to the first conveyor. It then passes along until it is deposited onto a second conveyor. The second conveyor is placed lower relative to the first conveyor so that the contaminated soil drops in elevation as it passes from the first conveyor to the second conveyor. One or more pretreatment sprayers are positioned substantially at this junction between the first conveyor and the second conveyor. These spray the contaminated soil with a mixture of hydrogen peroxide and water as it moves from the first conveyor to the second conveyor. One or more sprayers are also positioned on the second conveyor and spray the contaminated soil as it passes. Again, these spray the contaminated soil with a mixture of hydrogen peroxide and water. An aerator is located at the end of the second conveyor. The contaminated soil is further aerated as it drops off the end and contacts the aerator—which further serves to decontaminate it. One or more optional final sprayers can also be positioned on the second conveyor such that they are able to spray the contaminated soil as it drops off the depositing end and contacts the aerator.

DETAILED DESCRIPTION

Figure 1:
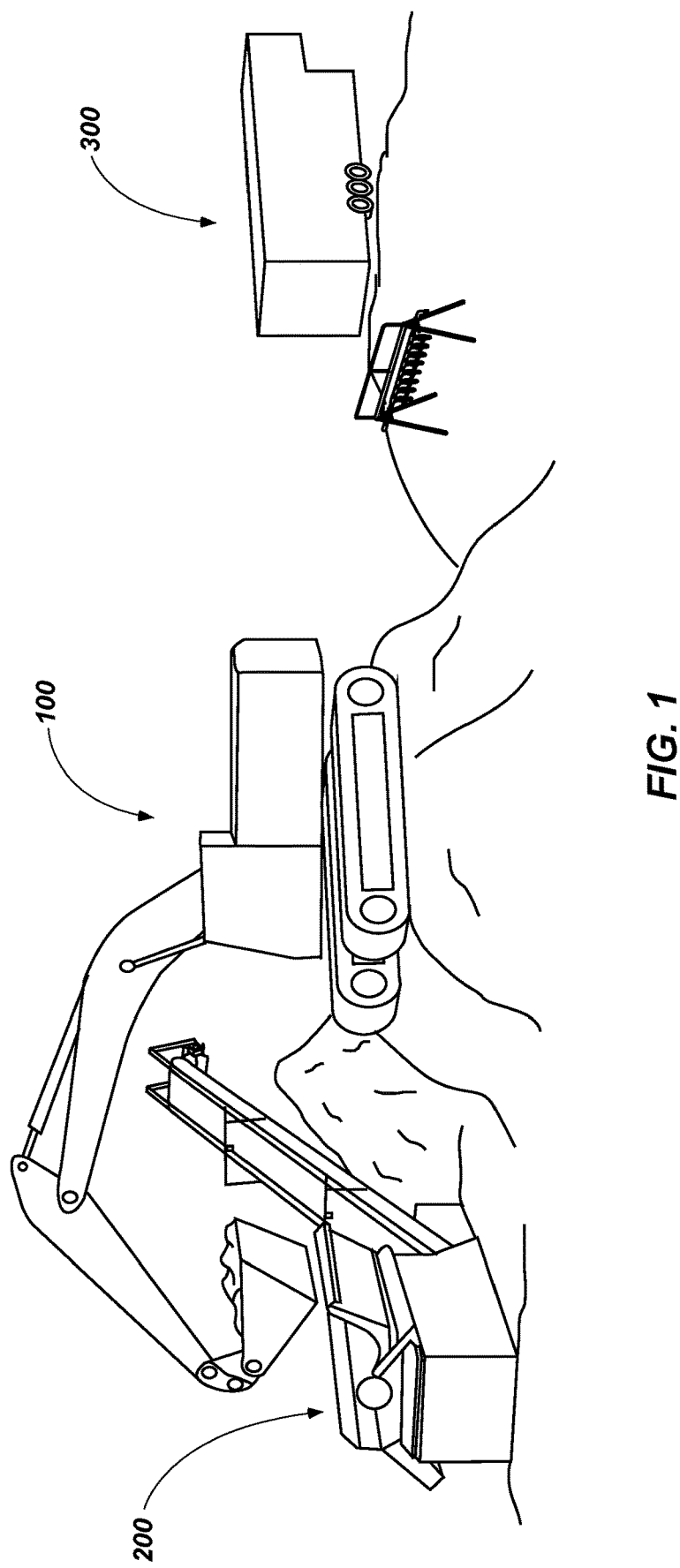
FIG. 1 depicts an overview of an excavator, a treatment system and an onsite mixing station in communication with the treatment system according to one embodiment of the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

The present invention in its various embodiments is an onsite system that allows for reclamation and remediation of soil contaminated with drilling by-products and waste. FIG. 1 depicts a general overview with an excavator 100, a treatment system 200 and an onsite mixing station 300 in communication with the treatment system.

Figure 2:
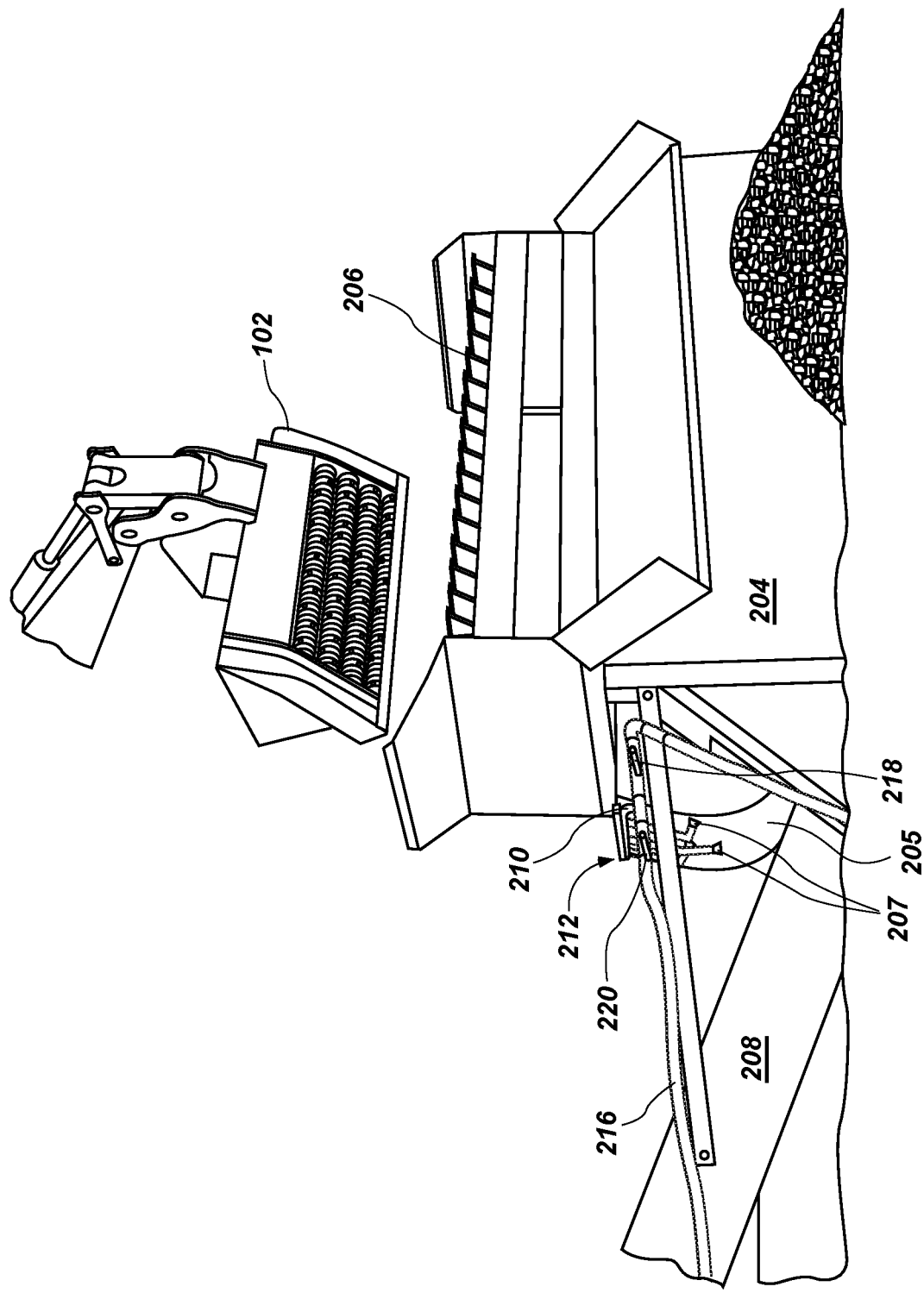
FIG. 2 illustrates the deposition of soil by the excavator bucket into the soil receptacle according to one embodiment of the present invention.

Referring to FIGS. 1 and 2, in operation, once a site in need of remediation is determined, the excavator 100 is positioned on the edge of a reserve pit. The excavator removes soil from the pit with bucket 102 and deposits it into a soil receptacle 204 on the treatment system 200—which in this depiction is a hopper. The excavator 100 in this illustration is a backhoe, but could be other excavation equipment including but not limited to draglines, suction excavators, long reach excavators, crawlers, compact excavators, power shovels and front loaders. A user would continue to remove contaminated soil from the pit until it reached a clean wall. The exact location of the clean wall can typically be determined by visual inspection.

The bucket 102 on the excavator 100 could be a standard bucket, but in certain embodiments, the bucket 102 is a shaker or a screening/crushing bucket as depicted in FIG. 2. Including the screener/crusher bucket is advantageous in that it provides a first level of both filtration and pulverization. Specifically, the screener/crusher bucket screens out large rocks and other debris-which are not going to be contaminated but do take up space and potentially interfere with the treatment of the soil in later sections of the system. The screener/crusher bucket also pulverizes the soil allowing for maximum surface area exposure—which makes the soil more responsive to the treating chemicals. A screening/crushing bucket suitable for use with the present invention is the SMH 4-17 Series screening bucket from ALLU Group Inc. (Teterboro, N.J.). However, it is noted that in other embodiments, such screening and crushing may not be necessary or desirable. In the illustrated embodiment, the soil receptacle 204 can also be equipped with one or more screening devices 206 that filter out large rocks and other objects not in need of decontamination. Such objects can then be discarded or simple piled up as depicted in FIG. 2.

Once the soil is deposited into the soil receptacle 204, it is then conveyed out of opening 205 to the conveyor 208. In this embodiment, the soil is carried out of the soil receptacle 204 onto conveyor 208 by a separate conveyor 209 (FIG. 6)—which in this case is a belt. This two conveyor feature can be advantageous as it increases aeration of the soil and allows improved penetration and saturation of the soil to be treated. Specifically, the first conveyor 209 is positioned somewhat higher relative to the second conveyor 208. This allows the soil to cascade down onto the second conveyor 208. This cascading action allows greater aeration of the soil before it reaches sprayers 222—which in and of itself is advantageous. However, one or more pretreatment sprayers 207 can also be positioned approximately adjacent to the opening 205.

Figure 3:
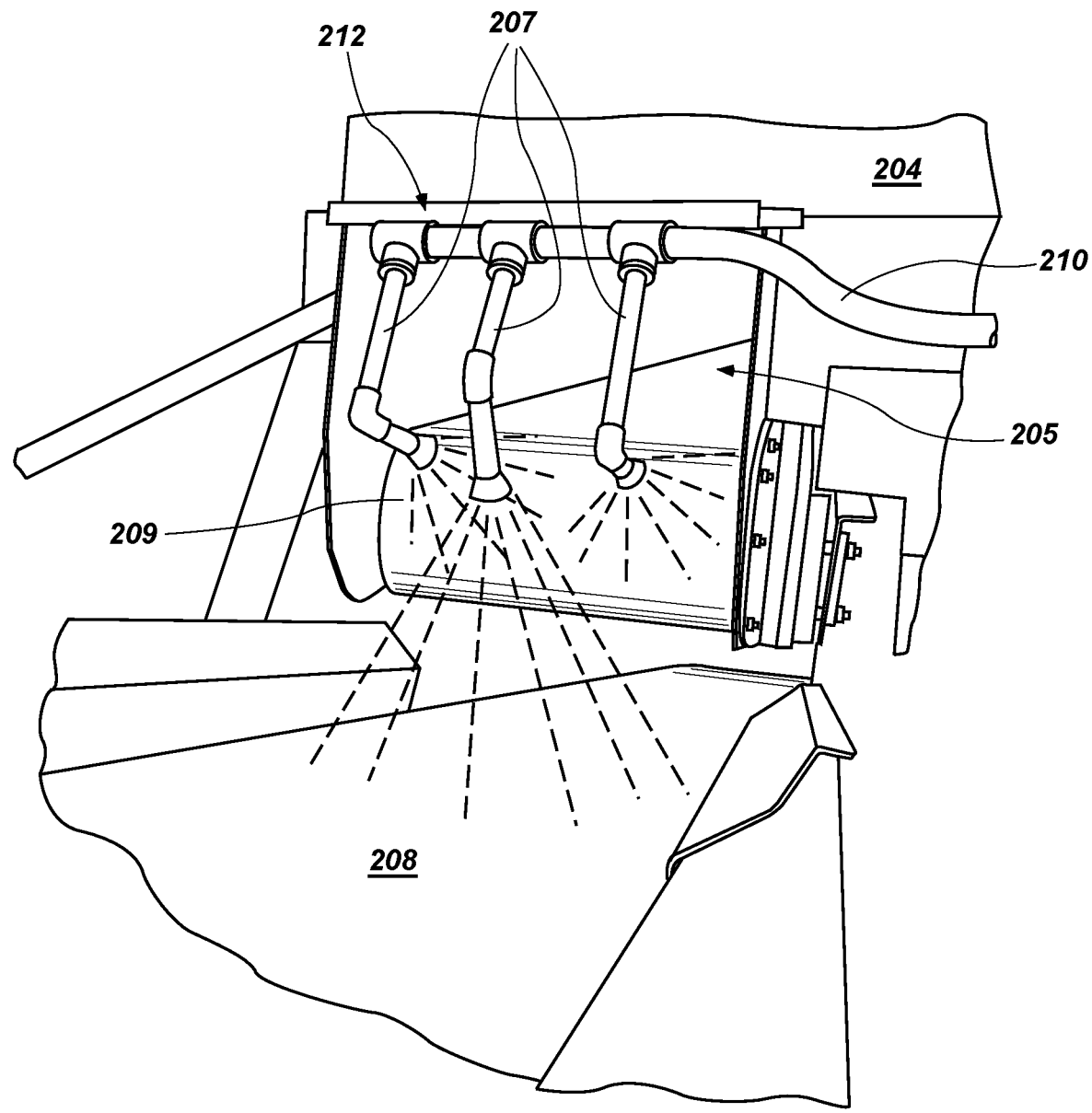
FIG. 3 is soil pretreatment station according to one embodiment of the present invention.
Figure 4:
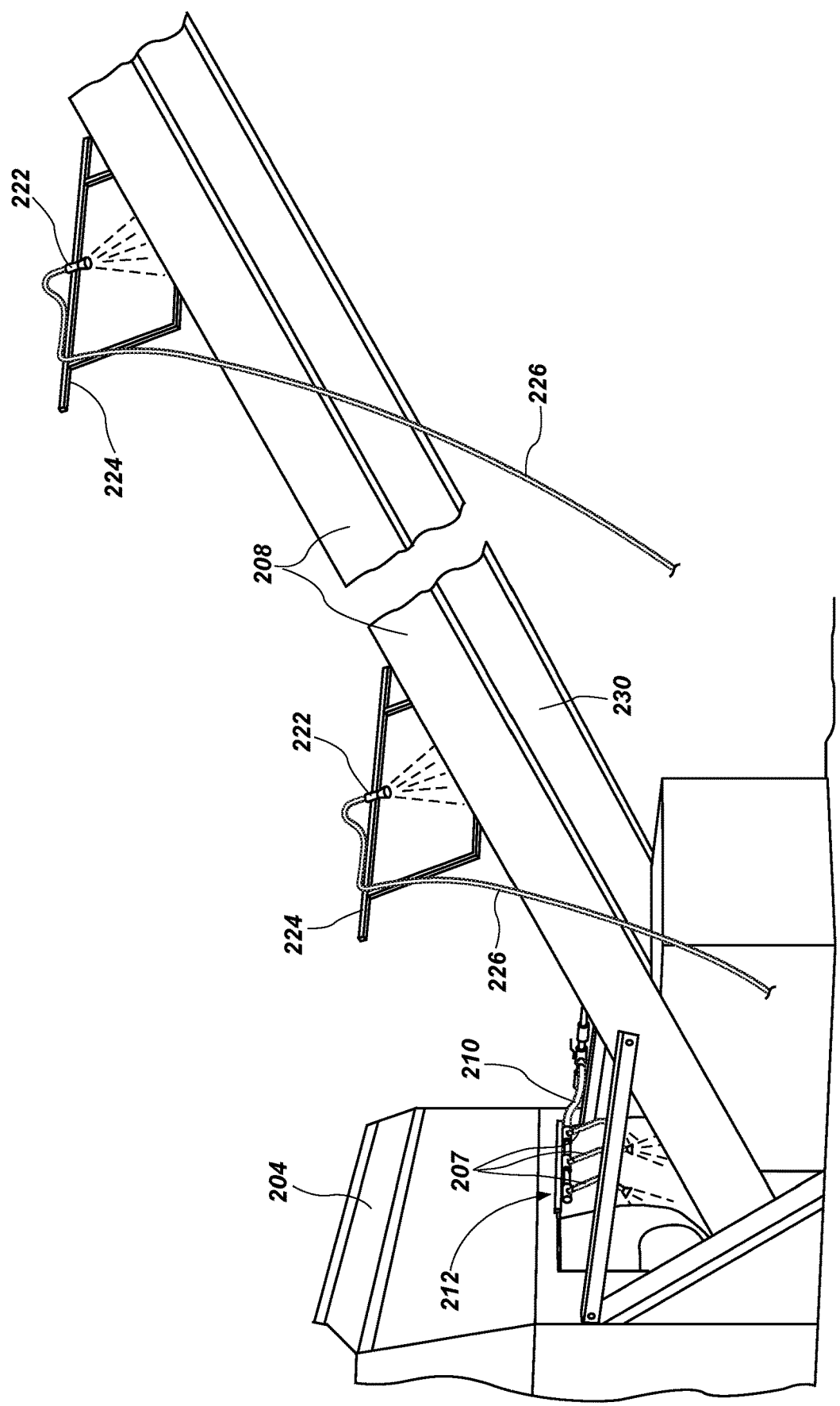
FIG. 4 is a side perspective of a treatment system according to one embodiment of the present invention.
Figure 5:
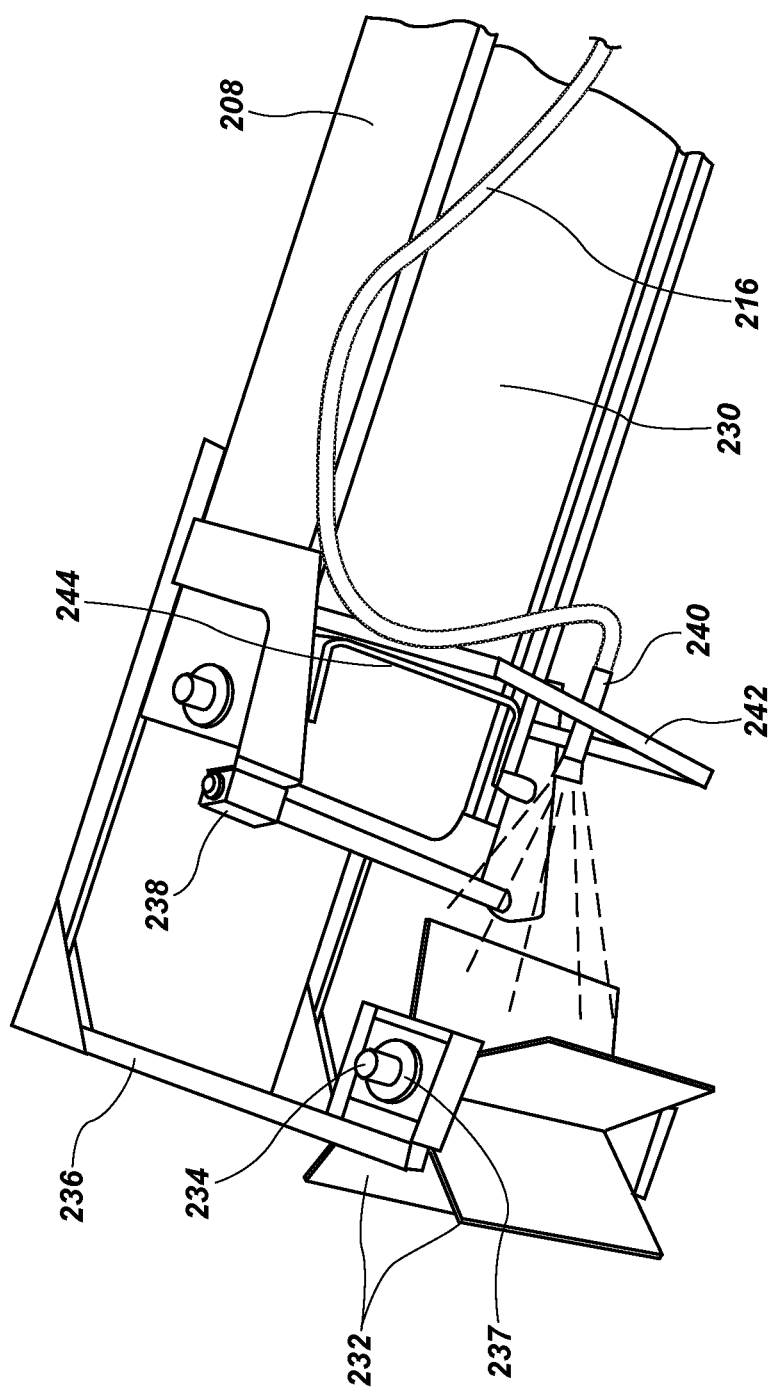
FIG. 5 is a bottom perspective of a treatment system depicting an aerator according to one embodiment of the present invention.

As better seen in FIGS. 3 and 4, the sprayers 207 in this embodiment are a series of nozzles connected to a manifold 212—which in this depiction is secured to the soil receptacle 204. The manifold 212 is in communication with a water and hydrogen peroxide source by one or more hoses 210. In the illustrated embodiment, the hoses include one or more local shut off valves 218, 220. It is noted that the positioning of the sprayers 207 over the soil in the pretreatment process could be accomplished without a manifold in some circumstances—especially if multiple sprayers 207 are not being utilized. The positioning of the manifold 212 itself can also vary depending on need and circumstances. For example, in some embodiments, the manifold 212 is directly attached to the conveyor 208. In other embodiments, it could be freestanding and simply positioned over opening 205.

Sprayers 207 can be in differing quantities and at differing angles. For example, in the illustrated embodiment, coverage and penetration are maximized by having two sprayers 207 angled at approximately ninety (90) degrees with the middle sprayer 207 being obtuse. In other embodiments, it may be desirable to adjust the angles. In certain embodiments, more or fewer sprayers 207 may be desirable.

Beyond improving penetration and saturation of the soil, pretreatment in this manner is advantageous because, early on in the treatment process, it prevents the release of volatile organic compounds. This allows for an open air system—i.e. the primary conveyor 208 need not be covered. Such an embodiment provides easier accessibility for repairs and maintenance. It also requires fewer materials in construction. Moreover, open air systems are safer and less prone to explosion. Specifically, some of the chemicals that are released from the soil as a byproduct of its treatment can be explosive—especially in higher concentrations. In closed chamber systems—as are used in the prior art—such gases can build up. If a spark happens to be emitted in operation, such treatment systems will ignite with potentially devastating effects.

While the pretreatment sprayers 207 discussed above are particularly advantageous due to the penetration and saturation they impart, different pretreatment wetting mechanisms could be used in other embodiments. For example, a drip sprinkler line could be positioned over the conveyor 208 in such a manner that the water/peroxide mixture sprinkles down on the soil being treated. In other embodiments, the line could have a substantially linear split right over the conveyor 208 allowing the mixture to be lightly cascaded over the soil. In yet other embodiments, atomizers could be used.

Similarly, while a two conveyor 209, 208 system is particularly advantageous, in certain circumstances it may be desirable to direct the soil from soil receptacle 204 onto conveyor 208 without an intervening conveyor 209. For example, in some embodiments, gravity could cause soil from a bottom opening in the soil receptacle 204 directly onto the primary conveyor 208. Corresponding pretreatment sprayers could be positioned to allow maximum spray coverage as soil drops.

Figure 6:
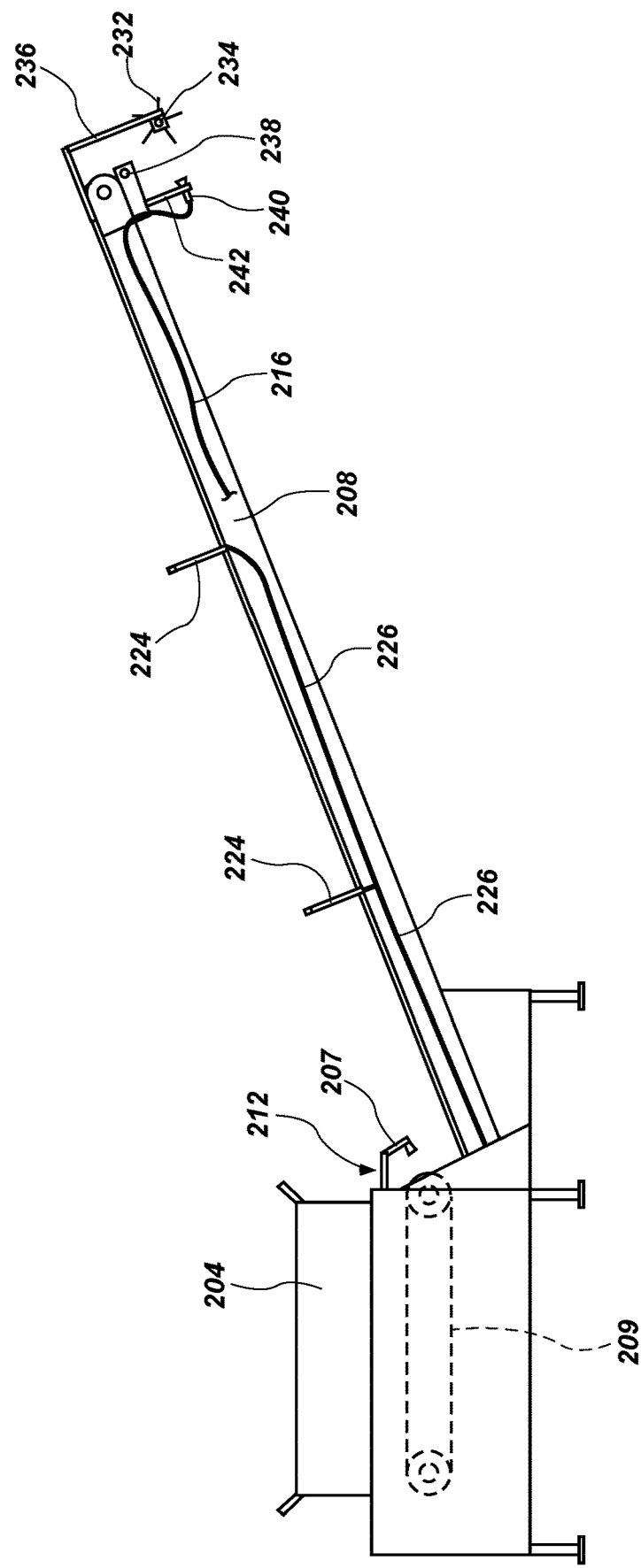
FIG. 6 is a side view of a treatment system according to one embodiment of the present invention depicting a two conveyor system.

In FIG. 6, the soil receptacle 204 and first conveyor 209 are depicted as components of a common system. However, in other embodiments, the first conveyor 209 could be a completely separate piece of equipment positioned underneath or adjacent to the soil receptacle 204.

Referring to FIG. 4, the conveyor 208 is shown in greater detail. In this embodiment, the conveyor 208 is a mobile Anaconda Conveyor available from Anaconda USA Inc., Bellingham, Mass. However, other brands and styles of conveyors could be utilized. A raised or adjustable height conveyor system is advantageous as it allows the treated soil to be piled higher than a flat conveyor would. A cyclical belt 230 conveyance mechanism is advantageous as it provides a surface on which the soil can be relatively thinly deposited in manageable quantities for treatment. This allows maximum penetration by the sprayers 222 and maximum exposure of the soil to the water/hydrogen peroxide mixture with minimal waste.

As pretreated soil is deposited on the belt 230 from soil receptacle 204, it is carried up underneath one or more spray stations. The treated soil then drops off the top edge of the conveyor 208 where it forms a pile. The belt 230 then cycles back around to receive additional soil and the process repeats itself. Thus, while operating, the conveyor 208 allows for a substantially continuous stream of soil to be treated—thus increasing efficiency. A belt 230 conveyor is also advantageous in this context as the soil being washed does not readily fall through or off the belt 230.

The spray stations include one or more sprayers 222 which in this embodiment are nozzles; but other wetting mechanisms as previously described herein could also be utilized. The sprayers 222 are secured to a frame 224 that is in turn secured to the conveyor 208. The sprayers 222 are in communication with a water/hydrogen peroxide supply. In the illustrated embodiment, this communication is through one or more hoses 226. While hoses are desirable because of their flexibility and ease of replacement, it is noted that in certain circumstances, it may be desirable to replace any of the hoses used in the present invention with other conduits such as acrylonitrile butadiene styrene (ABS), polyvinyl chloride (PVC), copper, steel and flex piping.

While the frame 224 is depicted as a substantially rectangular shape this frame, and other spray station frames as described herein, could take numerous other shapes including substantially rounded, substantially triangular, polygonal or combinations thereof. The frame 224 shown in the present photographs is metal; but it and other spray station frames discussed herein could be made of numerous other materials alone or in combination including, but not limited to, plastic, wood, rubber and rigid textiles. The sprayers 222 could be positioned over belt 230 in a variety of configurations and at varying angles. It is also noted that the frame 224 is depicted as being permanently connected to conveyor 108. However, in certain embodiments, the frame 224, as well as and other spray station frames discussed herein, may be free-standing independently of the conveyor 208. In other embodiments, the connection of frame 224 with the conveyor 208 may be temporary and removable rather than more permanently affixed. Similar connection mechanism options would apply to other spray station frames discussed herein.

At the end of the conveyor 208, after the soil has had multiple opportunities to be saturated with the water/hydrogen peroxide mixture, it drops off the end of the conveyor 208 to form a pile below. In the illustrated embodiment, conveyor 208 is equipped with a scraping edge 238. This facilitates the removal of the treated soil from the belt 230. This embodiment also includes an aerator 232 which further aerates the soil as it drops forming a pile on the surface beneath. In this illustration, the aerator 232 is a paddle wheel. An optional final sprayer 240 can be included to direct the water/hydrogen peroxide mixture at the aerated soil one final time as it drops. In this embodiment, the sprayer 240 is secured to the underside of the conveyor 208—which is advantageous, as the sprayer 240 thus positioned does not interfere with the aerator 232 or mechanics of the conveyor.

In the illustrated embodiment, the aerator 232 is secured to a frame 236 which in turn is coupled to the conveyor 208. As noted in connection with the sprayer frames previously, the aerator frame 236 could be permanently affixed to the conveyor 208; it could be temporarily and removably affixed; or it could be an independently standing structure. Referring again to the illustrated embodiments, the aerator 232 spins around axle 234 which is rotatably coupled at each end to an axle receptacle 237 on the frame 236.

It is noted that the aerator 232 as shown has five solid blades. However, it is noted the aerator 232 could include fewer or more blades. In certain embodiments, the blades may not be solid across the aerator 232. For example, in certain embodiments, each blade could be a series of smaller blades in a row with spaces between. In some instances, the different blades could be positioned in a staggered formation.

In certain embodiments, the aerator 232 is free spinning and rotates in response to the treated soil landing on its blades. In other embodiments, it may be desirable to have the aerator 232 rotated by a motor or other driving force.

The final sprayer 240 or spray station is secured to the conveyor 208 by frame 242. Again, frame 242 could be permanently affixed to the conveyor 208; it could be temporarily and removably affixed; or it could be an independently standing structure. In the illustrated embodiment, frame 242 also includes a secondary scraping edge 244. This edge 244 can be included to help ensure that residual treated soils on the conveyor 208 will be minimal as they can accumulate and, over time, gum up the conveyor 208. In some embodiments and, depending on need (e.g. for heavily saturated and thus sticky soils), it may be desirable to include additional scraping edges on the underside of conveyor 208.

It is also noted that sprayer 240 is in one embodiment in line with the water/hydrogen peroxide mixture that is used at the pretreatment stage. In other words, the hose 216 that feeds sprayer 240 extends back to the first treatment of the soil as it exits the hopper 204. However, in other embodiments, the pretreatment sprayers 207, the conveyor sprayers 222, and the final sprayer 240 could be fed from a common source of water/hydrogen peroxide or from different sources. Their hoses could run in series or separately.

Apart from the advantages identified above, the present invention in its various embodiments is also less prone to failure from rocks or other large, hard objects inadvertently being placed in the system. It is difficult to be overly precise when simply grabbing large volumes of soil from a contaminated site. Prior art systems contain soil shredders that would seize up should an unseen object manage to make its way into the system. In contrast, the present system would allow such materials to simply pass through causing no damage. It is heavy duty with few breakable and generally easily repairable parts and allows for use in a wide variety of locations and conditions. Moreover, because the present system can be modular, it also allows for a wide variety of conveyor 208 sizes and lengths to be utilized. Specifically, in the integrated systems of the prior art, shorter belting systems are used. These provide for greater mobility, but do not provide much flexibility in terms of length. A longer conveyor 208 means that more heavily contaminated soil can be more fully treated in a single pass, whereas with a shorter belt multiple passes might be required. Larger conveyors 208 also allow larger piles to be made—meaning that larger volumes of soil can be treated without having to move the system or remove the pile. This is advantageous as reserve pits come in a wide variety of sizes, shapes and depths.

Lastly, the present system, because of its simplification, allows for quick treatment of contaminated soils. Enclosed, auger driven systems of the prior art have numerous disadvantages—not the least of which is their relatively slow speed in advancing the contaminated soil. In such systems, slow progress may be necessary as saturation of the soil is more difficult. However, it makes for more inefficient operation and requires higher concentrations of hydrogen peroxide to be used. It is also noted that auger driven systems are also not well suited for rocky soils as they can seize up the auger. They are also not well suited for mud and would tend to get gummed up.

Once treated, the soil pile at the bottom of the conveyor 208 can be allowed to simply sit for an extended period of time. Because the present system does such an exceptional job of dispersing the water/hydrogen peroxide throughout the soil, it will continue to react and decontaminate. Once sufficiently decontaminated, a front loader or similar piece of heavy equipment can then be used to redeposit the treated soil back into the reserve pit. In this manner, large quantities of soil can be thoroughly treated onsite with minimal transportation required.

The hydrogen peroxide concentration in the mixture used in connection with the present invention can vary depending on the level of contaminants in the soil. A typical range is approximately six percent (6%) $H_2O_2$ up to approximately twenty eight percent (28%) $H_2O_2$ with approximately eight percent (8%) $H_2O_2$ being the most common concentration. However, in certain instances and depending on the contamination levels of the soil, the percentage of hydrogen peroxide could be less than one percent (1%) for lightly contaminated soils up to one hundred percent (100%) for extremely heavily contaminated soils. The present system allows for a significantly more efficient use of hydrogen peroxide at whatever concentration because it provides for maximum exposure of the soil to the treating chemicals.

The appropriate concentration of hydrogen peroxide can be gauged by field tests. For example, after an initial run, soil samples can be sent off for testing of contaminant levels. If the percentage of contaminants is too high, hydrogen peroxide levels can be increased. If contaminant levels are sufficiently low or zero, hydrogen peroxide levels could be left the same or dialed back so as to avoid unnecessary waste.

Figure 8:
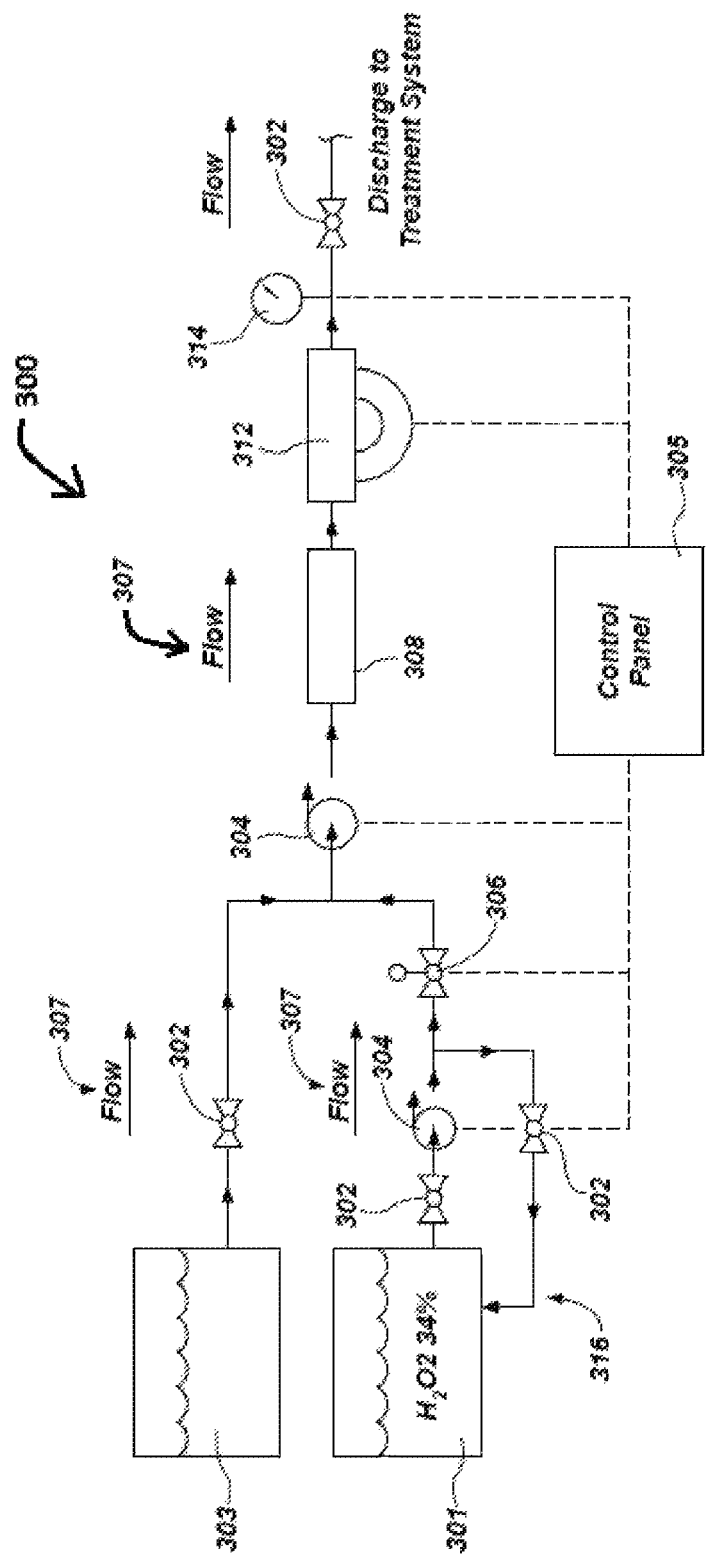
FIG. 8 is a schematic depiction of a mixing station according to one embodiment of the present invention.

Referring now to FIG. 8, a schematic depiction of the mixing station 300 is shown according to one embodiment of the present invention. Hydrogen peroxide storage tanks 301 and water storage tanks 303 are shown in communication with a control panel 305. In operation, a user would indicate through control panel 305 what concentration of hydrogen peroxide is desired. As noted above, this determination would be based on field tests and other indicators of soil contamination levels. Measured quantities of water and hydrogen peroxide would then be directed to mixing tube 308 with a variety of valves 302—which in this illustration are ball valves—and pumps 304—which in this illustration are centrifugal pumps. Flow is shown generally at 307. Once mixed, the treatment solution is then directed to treatment system 200 for application to the contaminated soil as discussed above through the various sprayers 207, 222, 240. Excess hydrogen peroxide can be directed back to its storage tank 301 by return line 316.

An automated ball valve 306 can be utilized to regulate water flow and thereby increase or decrease hydrogen peroxide concentrations. Control panel 305 in this embodiment is a SCADA (Supervisory Control and Data Acquisition) driven system with a touch screen mounted inside an industrial control panel enclosure. However, other control panels as would be apparent to one skilled are also considered within the scope of the present invention.

A mass flow meter 312, such as a corialis meter or a densometer, allows a user to control volume of the mixed treatment solution as it is released to the treatment system 200. Other flow meters as would be apparent to one skilled in the art are also considered within the scope of the present invention.

A digital pressure gauge 314 can be included to prevent the system from being over-pressured—which could potentially cause a rupture in some part of the system. A kinked hose, clogged nozzle, or abruptly closed valve can cause the system pressure to spike to damaging levels and the digital pressure gauge prevents any kind of rupture by shutting down the pumps at a pre-specified and adjustable level as determined by pounds per square inch (PSI).

It is noted that while FIG. 8 gives an illustration of a mixing station architecture, numerous mixing systems and methods alone or in combination could be utilized with the present invention in its various embodiments. One key advantage of the present system is that it allows instantaneous and onsite adjustments to be made to hydrogen peroxide levels. Thus, the present system allows for maximum efficiency and reduced costs. The portable mixing station is also advantageous in that it allows the entirety of the decontamination process to be done onsite and for longer durations without having to be resupplied. When depleted, the hydrogen peroxide and water tanks 301, 303 can be recharged with an onsite water supply such as a truck as well as surplus hydrogen peroxide containers through inlet valves or other known recharging techniques. The present invention in its various embodiments is also advantageous in that multiple mixing stations can be employed on a single site.

It is noted that in certain embodiments, it may be possible to mix the water and peroxide immediately preceding the sprayers 207, 222, 240. However, use of the mixing station 300 allows higher levels of control to be exercised and more precision in the mixing process.

Figure 7:
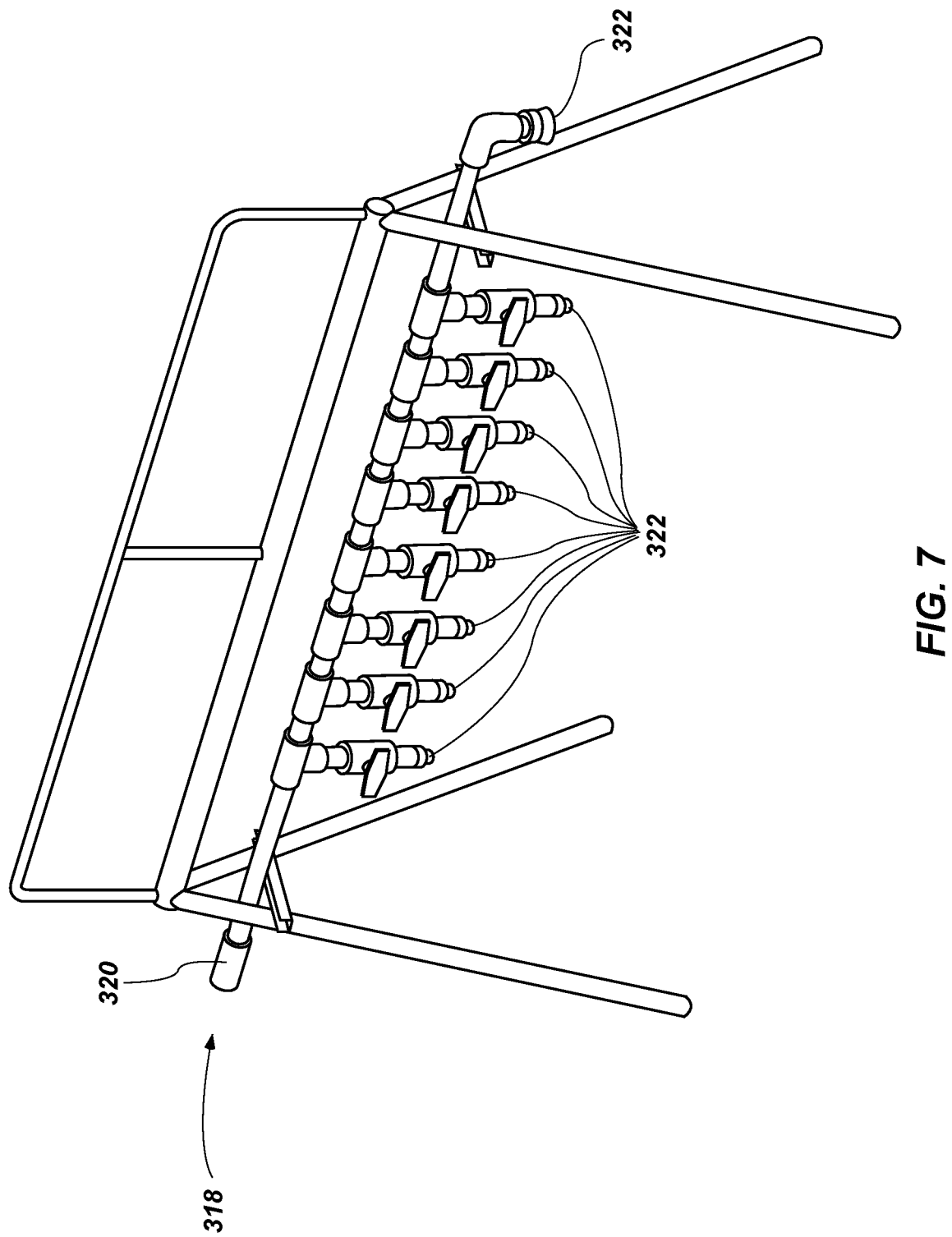
FIG. 7 is a front perspective of a manifold according to one embodiment of the present invention.

Referring to FIG. 7, an example of a manifold 318 is shown according to one embodiment of the present invention. The manifold 318 includes an inlet 320 and multiple outlet ports 322. A line from the mixing station 300 (FIG. 1) containing the mixed hydrogen peroxide and water can be secured to inlet 320. Hoses, such as hoses 216, 226, can connect to the outlet ports 322. Thus, the manifold 318 allows a single source of water mixed with hydrogen peroxide to be relayed through multiple conduits to multiple sprayer locations. For example, certain hoses can be directed to pretreatment and final sprayers 207 and 240, while other types of hoses can be directed to belt sprayers 222. This particular manifold also allows a variety of hose fixtures to be utilized.

In some circumstances, a wind shield that can be employed in connection with the conveyor 208. In particular, hydrogen peroxide in high concentrations can be caustic and therefore in windy conditions it may be desirable to contain the spray. In certain embodiments, a canvas covering can be placed over the conveyor 208. This covering can be at the spray stations alone or it can be continuous along the length of the conveyor 208. The covering could be made of numerous other materials as would be apparent to one skilled in the art alone or in combination. In some instances, a flexible covering is preferred. In other circumstances, a hard shell covering is preferred. In some instances, a covering having both features is desirable.

Figure 9:
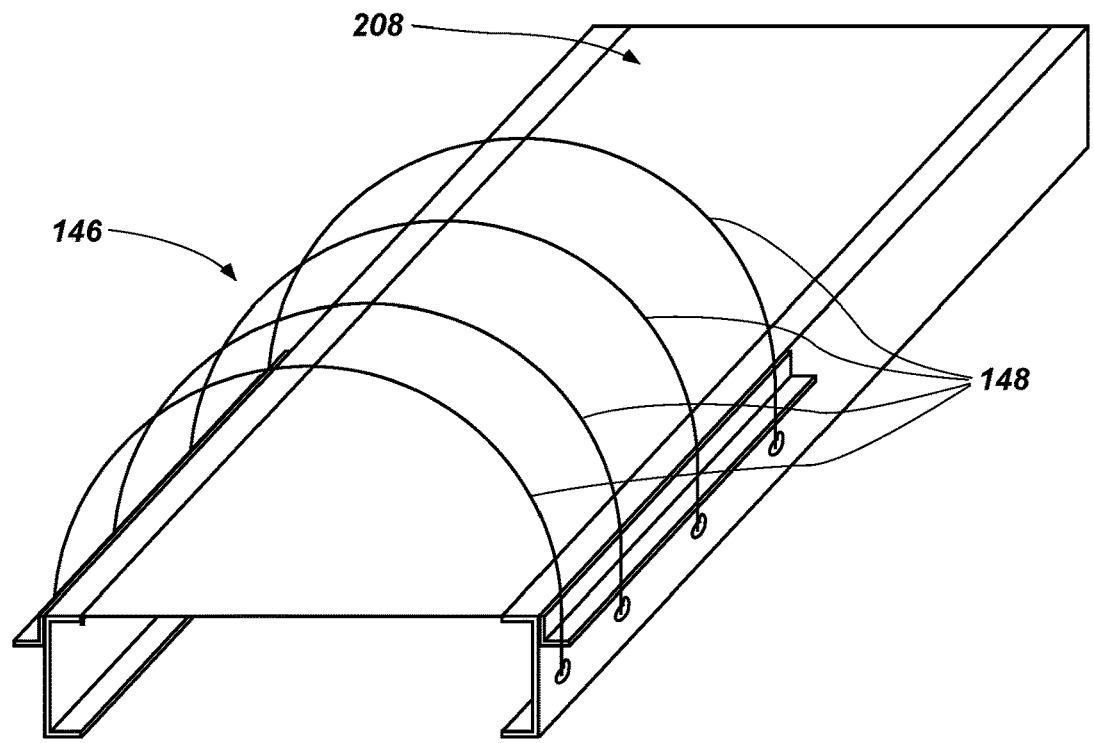
FIG. 9 depicts a conveyor cover frame according to one embodiment of the present invention.

FIG. 9 is an illustration of a canopy frame 146 design according to one embodiment of the present invention with framing elements 148 arching across the top of the conveyor 208 and connecting on opposing sides. Framing elements 148 are depicted in this embodiment as secured to the conveyor 208. This could be done with numerous known securing mechanisms as would be apparent to one skilled in the art including, but not limited to snaps, screws, hook and loop and adhesives. Framing elements 148 could be made of various materials including but not limited to plastic, wood, metal and combinations thereof.

Figure 10:
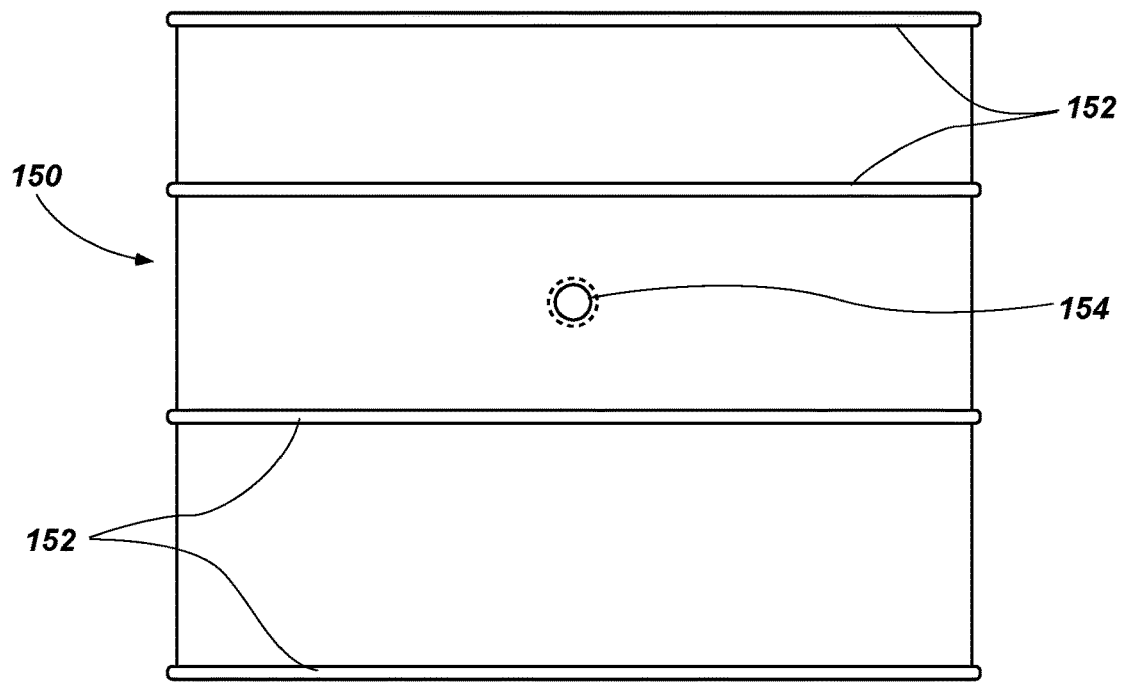
FIG. 10 depicts a conveyor cover canopy according to one embodiment of the present invention.

FIG. 10 is an illustration of a canopy 150 design according to one embodiment of the present invention with looms 152 that correspond to the framing elements 148 and through which the framing elements 148 are threaded. Canopy 150 can also include an opening 154 through which a hose or other source of hydrogen peroxide and water can be directed.

What is claimed is:

1. A system for treating a contaminated soil comprising:
 a) a soil receptacle;
 b) a first conveyor having a first end and a second end and wherein the first end is in communication with the soil receptacle;
 c) a second conveyor having a third end and a fourth end and wherein the third end is in communication with the second end of the first conveyor and the third end is beneath the second end creating a space between the first conveyor and the second conveyor where the contaminated soil leaves the first conveyor and drops through the space to the second conveyor;
 d) a first pretreatment sprayer and a second pretreatment sprayer positioned at a junction between the first conveyor and the second conveyor, wherein the first pretreatment sprayer sprays the contaminated soil in the space as the contaminated soil drops from the first conveyor to the second conveyor; and the second pretreatment sprayer sprays the contaminated soil on the second conveyor simultaneously with the first pretreatment sprayer spraying the contaminated soil in the space as the contaminated soil drops from the first conveyor to the second conveyor; and
 e) one or more sprayers positioned on the second conveyor wherein the one or more sprayers spray the contaminated soil as the contaminated soil passes.

2. The system of claim 1 further including an aerator the fourth end of the second conveyor, whereby the contaminated soil is further aerated as the contaminated soil drops off the fourth end of the second conveyor and contacts the aerator.

3. The system of claim 2 further including one or more final sprayers positioned on the second conveyor wherein the one or more final sprayers spray the contaminated soil as the contaminated soil drops off the fourth end and contacts the aerator.

4. The system of claim 1, wherein the first pretreatment sprayer and the second pretreatment sprayer are coupled to the soil receptacle.

5. The system of claim 1, wherein the first pretreatment sprayer and the second pretreatment sprayer are coupled to the first conveyor.

6. The system of claim 1, wherein the first pretreatment sprayer and the second pretreatment sprayer are coupled to the second conveyor.

7. A system for treating a contaminated soil comprising:
 a) a soil receptacle;
 b) a first conveyor having a first end and a second end and wherein the first end is in communication with the soil receptacle;
 c) a second conveyor having a third end and a fourth end and wherein the third end is in communication with the second end of the first conveyor and the third end is beneath the second end creating a space between the first conveyor and the second conveyor where the contaminated soil leaves the first conveyor and drops through the space to the second conveyor; and
 d) a first pretreatment sprayer and a second pretreatment sprayer positioned at a junction between the first conveyor and the second conveyor, wherein the first pretreatment sprayer sprays the contaminated soil in the space as the contaminated soil drops from the first conveyor to the second conveyor and the second pretreatment sprayer simultaneously sprays the contaminated soil on the second conveyor; and the second pretreatment sprayer sprays the contaminated soil on the second conveyor simultaneously with the first pretreatment sprayer spraying the contaminated soil in the space as the contaminated soil drops from the first conveyor to the second conveyor.

8. The system of claim 7, further including one or more sprayers positioned on the second conveyor wherein the one or more sprayers spray the contaminated soil as the contaminated soil passes.

9. The system of claim 7, further including an aerator at the fourth end of the second conveyor, whereby the contaminated soil is further aerated as the contaminated soil drops off the depositing fourth end of the second conveyor and contacts the aerator.

10. The system of claim 9, further including one or more final sprayers positioned on the second conveyor wherein the one or more final sprayers spray the contaminated soil as the contaminated soil drops off the fourth end and contacts the aerator.

11. The system of claim 7, wherein the first pretreatment sprayer and the second pretreatment sprayer are coupled to the soil receptacle.

12. The system of claim 7, wherein the first pretreatment sprayer and the second pretreatment sprayer are coupled to the first conveyor.

13. The system of claim 7, wherein the first pretreatment sprayer and the second pretreatment sprayer are coupled to the second conveyor.

14. A system for treating a contaminated soil comprising:
 a) a soil receptacle;
 b) a first conveyor having a first end and a second end and wherein the first end is in communication with the soil receptacle;
 c) a second conveyor having a third end and a fourth end and wherein the third end is in communication with the second end of the first conveyor and the third end is beneath the second end creating a space between the first conveyor and the second conveyor where the contaminated soil leaves the first conveyor and drops through the space to the second conveyor;

d) a first pretreatment sprayer and a second pretreatment sprayer positioned at a junction between the first conveyor and the second conveyor, wherein the first pretreatment sprayer sprays the contaminated soil in the space as the contaminated soil drops from the first conveyor to the second conveyor and the second pretreatment sprayer simultaneously sprays the contaminated soil on the second conveyor; and the second pretreatment sprayer sprays the contaminated soil on the second conveyor simultaneously with the first pretreatment sprayer spraying the contaminated soil in the space as the contaminated soil drops from the first conveyor to the second conveyor; and e) one or more sprayers positioned on the second conveyor wherein the one or more sprayers spray the contaminated soil as the contaminated soil passes;

f) an aerator at a depositing end of the second conveyor, whereby the contaminated soil is further aerated as the contaminated soil drops off the depositing end of the second conveyor and contacts the aerator; and g) one or more final sprayers positioned on the second conveyor wherein the one or more final sprayers spray the contaminated soil as the contaminated soil drops off the depositing end and contacts the aerator.

15. The system of claim 14, wherein the space is a vertical drop between the end of the first conveyor and the third end of the second conveyor.

16. The system of claim 14, wherein the third end of the second conveyor is behind the end of the first conveyor.

17. The system of claim 14, wherein the contaminated soil completely leaves the first conveyor before contacting the second conveyor.

18. The system of claim 14, wherein the first pretreatment sprayer and the second pretreatment sprayer are coupled to the soil receptacle.

19. The system of claim 14, wherein the first pretreatment sprayer and the second pretreatment sprayer are coupled to the first conveyor.

* * * * *